United States Patent
Shimode et al.

(10) Patent No.: US 10,922,632 B2
(45) Date of Patent: Feb. 16, 2021

(54) PEOPLE FLOW PREDICTION DEVICE

(71) Applicant: HITACHI SOLUTIONS, LTD., Tokyo (JP)

(72) Inventors: Naoki Shimode, Tokyo (JP); Akinori Asahara, Tokyo (JP); Masahiro Oba, Tokyo (JP); Takashi Mishima, Tokyo (JP); Tomohide Suzuki, Tokyo (JP)

(73) Assignee: HITACHI SOLUTIONS, LTD., Tokyo (JP)

( * ) Notice: Subject to any disclaimer, the term of this patent is extended or adjusted under 35 U.S.C. 154(b) by 220 days.

(21) Appl. No.: 16/118,611

(22) Filed: Aug. 31, 2018

(65) Prior Publication Data

US 2019/0295007 A1    Sep. 26, 2019

(30) Foreign Application Priority Data

Mar. 26, 2018  (JP) .................................. 2018-059093

(51) Int. Cl.
  *G06Q 10/04* (2012.01)
  *G06Q 50/30* (2012.01)
  *G08G 1/01* (2006.01)
  *G01C 21/34* (2006.01)

(52) U.S. Cl.
  CPC .......... *G06Q 10/04* (2013.01); *G01C 21/3492* (2013.01); *G06Q 50/30* (2013.01); *G08G 1/0133* (2013.01)

(58) Field of Classification Search
  CPC ................................ G06Q 10/04; G06Q 50/30
  See application file for complete search history.

(56) References Cited

U.S. PATENT DOCUMENTS

2018/0018572 A1*  1/2018  Wang ..................... G06Q 50/30

FOREIGN PATENT DOCUMENTS

| JP | 2004-070481 A | 3/2004 |
| JP | 2004-178358 A | 6/2004 |
| JP | 2005-038343 A | 2/2005 |
| JP | 2011-075393 A | 4/2011 |
| JP | 5596592 B | 9/2014 |
| JP | 2015-219673 A | 12/2015 |
| JP | 6062124 B | 1/2017 |

OTHER PUBLICATIONS

Japanese Office Action dated Dec. 8, 2020 for Japanese Patent Application No. 2018-059093.

* cited by examiner

*Primary Examiner* — Todd Melton
(74) *Attorney, Agent, or Firm* — Volpe Koenig

(57) ABSTRACT

A client device accepts event information for which a people flow prediction is to be performed from a user and the client device inputs the accepted event information to a people flow prediction device. The people flow prediction device outputs a result of people flow prediction responsive to the input event information to the client device and the client device displays the result of people flow prediction to the user. The people flow prediction device performs a people flow prediction by temporally and spatially allocating an event attendance which has been input from the client device to pathways, each connecting a transport facility at which a people flow originates and an event site. Consequently, it is possible to predict a flow of people who attend an event or the like, the people flow differing from that in an ordinary situation, without need to input real-time data.

4 Claims, 15 Drawing Sheets

FIG. 4A

EVENT INFORMATION 401

| ITEM NO. | ITEM NAME | DESCRIPTION |
|---|---|---|
| 1 | EVENT NAME | NAME OF EVENT |
| 2 | EVENT TYPE | NAME OF EVENT TYPE |
| 3 | EVENT SITE POSITION | POSITIONAL COORDINATES OF EVENT SITE (DEPENDING ON A COORDINATE SYSTEM SUCH AS LATITUDE/LONGITUDE) |
| 4 | EVENT DATE | YEAR, MONTH, AND DAY WHEN EVENT TAKES PLACE |
| 5 | EVENT SITE OPEN TIME | TIME AT WHICH EVENT SITE OPENS |
| 6 | EVENT START TIME | TIME AT WHICH EVENT STARTS |
| 7 | EVENT END TIME | TIME AT WHICH EVENT ENDS |
| 8 | ATTENDANCE | TOTAL NUMBER OF PEOPLE WHO ATTEND EVENT OR ITS PREDICTED VALUE |

FIG. 4B

PEOPLE FLOW PREDICTION POINT DATA 402

| ITEM NO. | ITEM NAME | DESCRIPTION |
|---|---|---|
| 1 | PERSON ID | UNIQUE NUMBER ASSIGNED TO EACH INDIVIDUAL PERSON |
| 2 | PERSON POSITION | POSITION OF EACH INDIVIDUAL PERSON |
| 3 | TIME | TIME AT WHICH PERSON (402, ITEM NO. 1) WAS AT POSITIONAL COORDINATES (402, ITEM NO. 2) |

FIG. 5A
MAP INFORMATION 501

| ITEM NO. | ITEM NAME | DESCRIPTION |
|---|---|---|
| 1 | TRANSPORT FACILITY DATA 502 | A SET OF ATTRIBUTES INCL. POSITIONAL COORDINATES OF TRANSPORT FACILITY AMONG OTHERS |
| 2 | ROAD INFORMATION 503 | INFORMATION ON A PATHWAY THAT PEDESTRIANS CAN GO THROUGH |

FIG. 5B
TRANSPORT FACILITY DATA 502

| ITEM NO. | ITEM NAME | DESCRIPTION |
|---|---|---|
| 1 | TRANSPORT FACILITY NAME | NAME OF BUS STOP, STATION, OR THE LIKE |
| 2 | TIMETABLE | TIMETABLE OF TRANSPORT FACILITY |
| 3 | TRANSPORT FACILITY POSITION | POSITION OF STATION, BUST STOP, OR THE LIKE (DEPENDING ON A COORDINATE SYSTEM SUCH AS LATITUDE/LONGITUDE) |
| 4 | TRANSPORT FACILITY STATISTICAL INFORMATION | STATISTICS ON USAGE OF TRANSPORT FACILITY |
| 5 | TRANSPORT FACILITY TYPE | TYPE OF TRANSPORT FACILITY SUCH AS BUS, RAILROAD, ETC. |

FIG. 5C
ROAD INFORMATION 503

| ITEM NO. | ITEM NAME | DESCRIPTION |
|---|---|---|
| 1 | GEOMETRY | GEOMETRY THAT DEFINES CENTERLINE OF ROAD |
| 2 | ATTRIBUTE | ATTRIBUTE SUCH AS ROAD WIDTH, PATHWAY LENGTH, ETC. |

FIG. 6A
PEOPLE FLOW DATA 601

| ITEM NO. | ITEM NAME | DESCRIPTION |
|---|---|---|
| 1 | MESH ID | ID SPECIFIC TO AREA MESH |
| 2 | TIME | TIME OF MEASUREMENT OF THE NUMBER OF PEOPLE |
| 3 | COUNT | HOW MANY PERSONS STAYED IN MESH AT GIVEN TIME (IN UNITS OF PERSONS/TIME) |
| 4 | DATE | DATE WHEN NUMBER OF PEOPLE WAS MEASURED |
| 5 | EVENT FLAG | WHETHER OR NOT THIS DATA IS PEOPLE FLOW DATA ON EVENT DATE |

FIG. 6B
EVENT INFORMATION 602

| ITEM NO. | ITEM NAME | DESCRIPTION |
|---|---|---|
| 1 | EVENT NAME | NAME OF EVENT |
| 2 | EVENT TYPE | NAME OF EVENT TYPE |
| 3 | EVENT SITE POSITION | POSITIONAL COORDINATES OF EVENT SITE (DEPENDING ON COORDINATE SYSTEM SUCH AS LATITUDE/LONGITUDE) |
| 4 | EVENT DATE | YEAR, MONTH, AND DAY WHEN EVENT TAKES PLACE |
| 5 | EVENT SITE OPEN TIME | TIME AT WHICH EVENT SITE OPENS |
| 6 | EVENT START TIME | TIME AT WHICH EVENT STARTS |
| 7 | EVENT END TIME | TIME AT WHICH EVENT ENDS |
| 8 | ATTENDANCE | TOTAL NUMBER OF PEOPLE WHO ATTEND EVENT OR ITS PREDICTED VALUE |

FIG. 7A

NEARBY TRANSPORT FACILITY DATA 701

| ITEM NO | ITEM NAME | DESCRIPTION |
|---|---|---|
| 1 | TRANSPORT FACILITY NAME | NAME OF BUS STOP, STATION, OR THE LIKE |
| 2 | TIMETABLE | TIMETABLE OF TRANSPORT FACILITY |
| 3 | TRANSPORT FACILITY POSITION | POSITION OF STATION, BUST STOP, OR THE LIKE |
| 4 | TRANSPORT FACILITY STATISTICAL INFORMATION | STATISTICS ON USAGE OF TRANSPORT FACILITY |
| 5 | TRANSPORT FACILITY TYPE | TYPE OF TRANSPORT FACILITY SUCH AS BUS, RAILROAD, ETC. |
| 6 | SIMILAR EVENT | EVENT INFORMATION (602) |

FIG. 7B

TEMPORAL & SPATIAL ALLOCATION DATA 702

| ITEM NO | ITEM NAME | DESCRIPTION |
|---|---|---|
| 1 | NEARBY TRANSPORT FACILITY DATA | POINTER TO NEARBY TRANSPORT FACILITY DATA 701 |
| 2 | PATHWAY INFORMATION | INFORMATION ON A ROAD (503) CONNECTING TRANSPORT FACILITY AND EVENT SITE |
| 3 | SPATIAL ALLOCATION RATIO | PROPORTION OF NUMBER OF PEOPLE FLOWING ALONG PATHWAY (ITEM NO. 2) AMONG ATTENDANCE (401, ITEM NO. 8) |
| 4 | TEMPORAL DISTRIBUTION FUNCTION | FUNCTION EXPRESSING TEMPORAL BIAS OF PEOPLE GATHERING AT ORIGIN OF PATHWAY (ITEM NO. 2) |

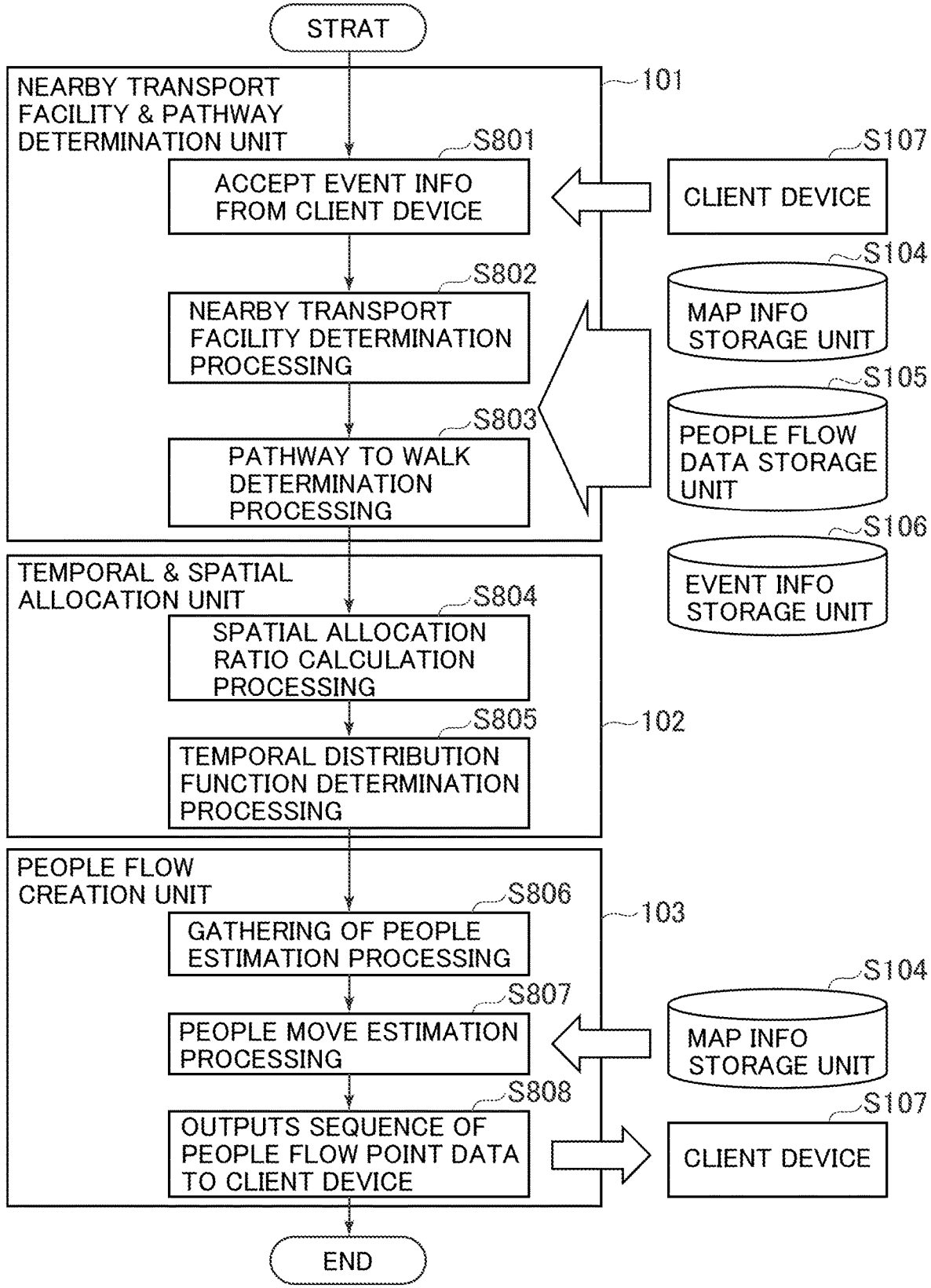

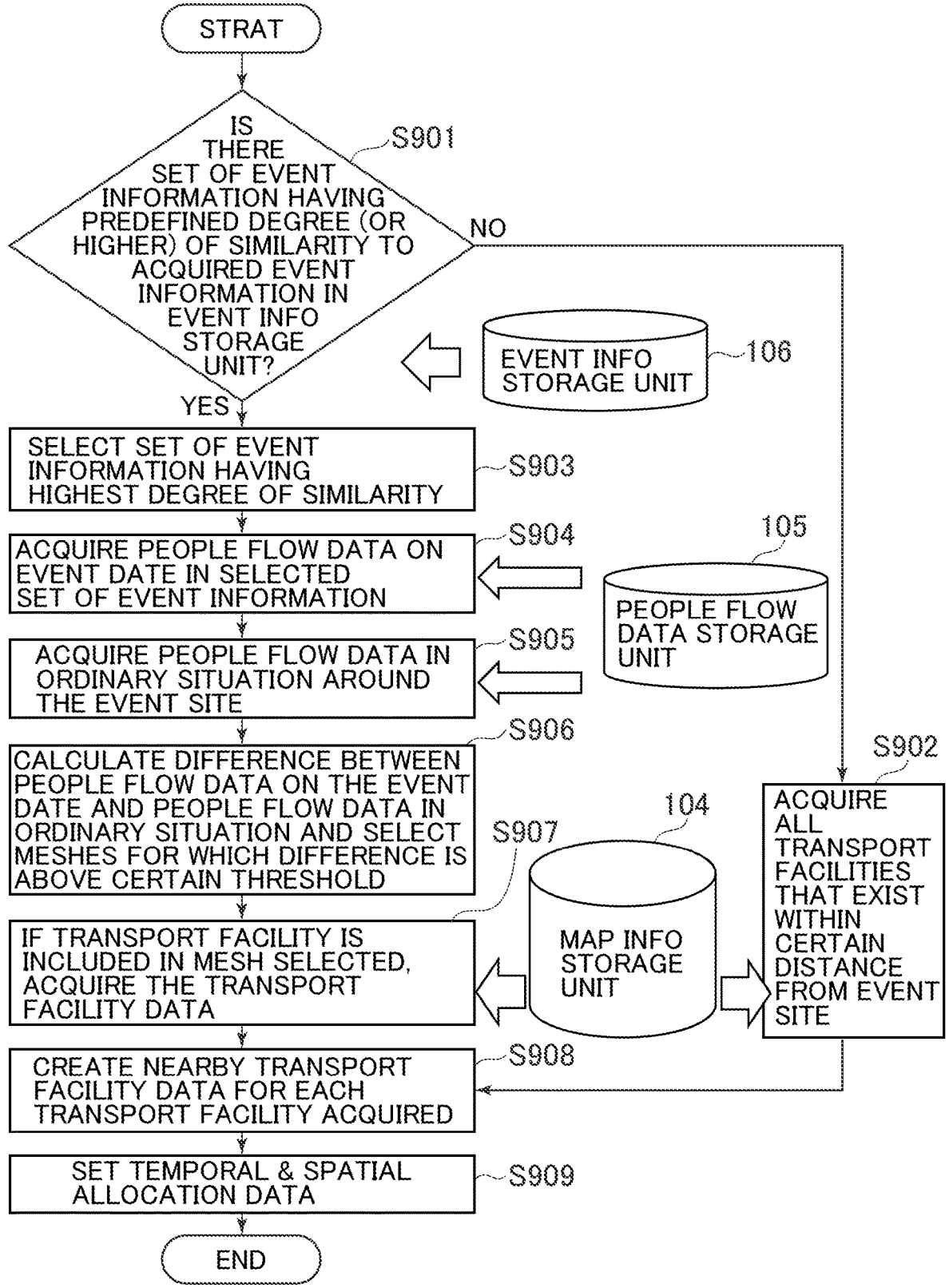

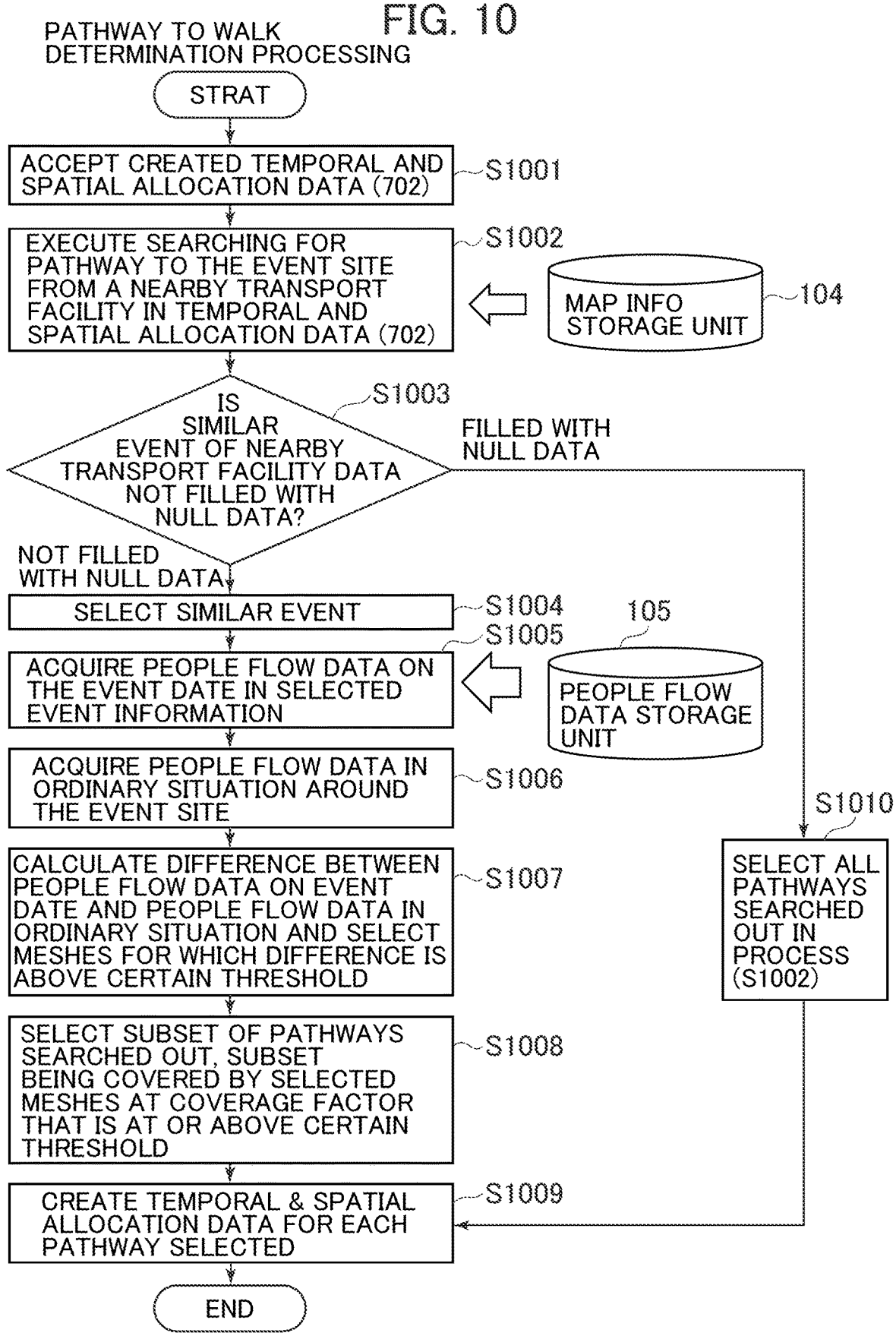

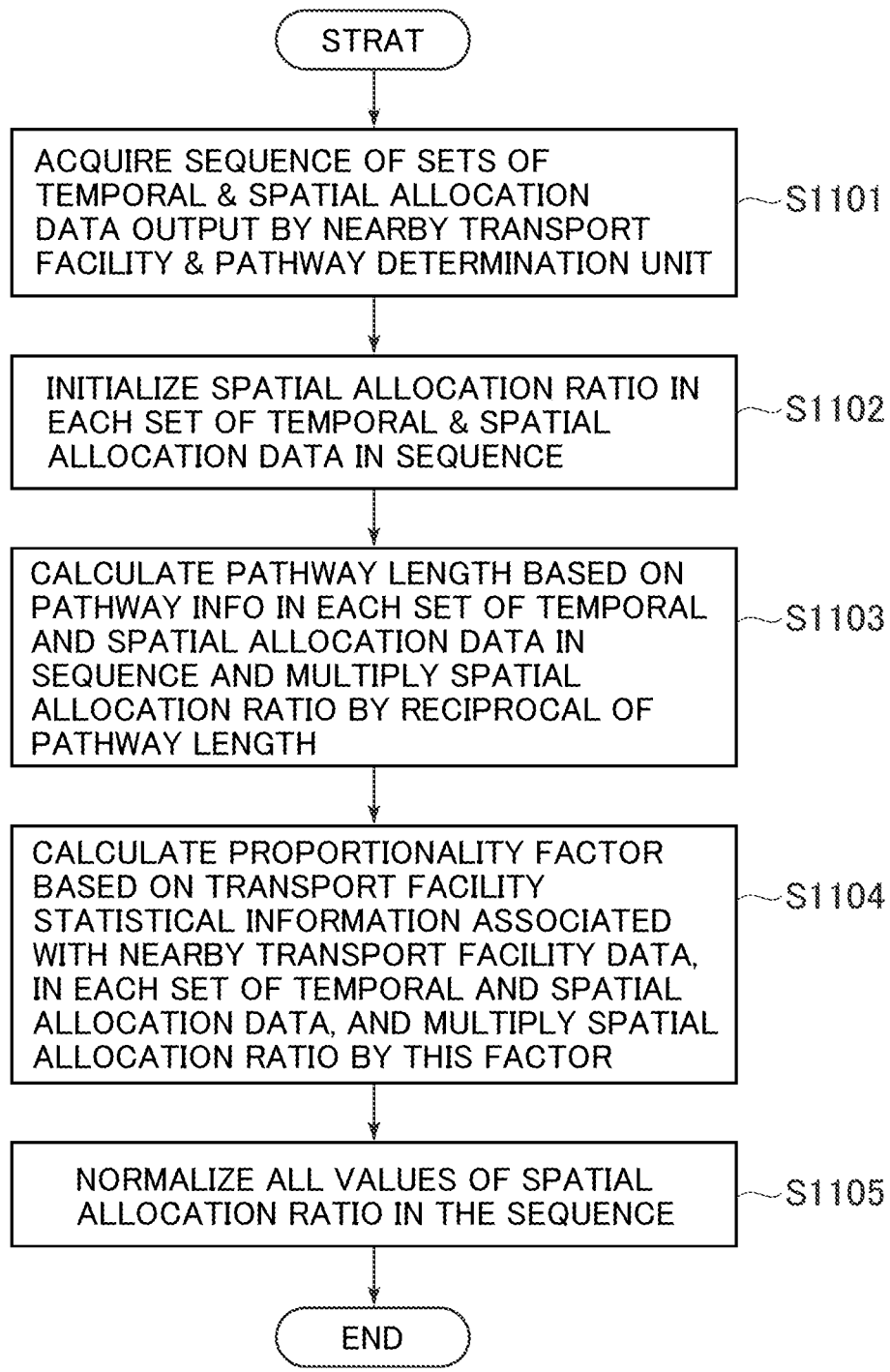

PEOPLE FLOW PREDICTION DEVICE

TECHNICAL FIELD

The present invention relates to a people flow prediction device.

BACKGROUND ART

When an event such as a carnival takes place, it is conceived to predict a crowd (people flow) which will occur from transport facilities such as a bus stop and a railroad station toward the event site or a people flow which will occur from the event site toward the transport facilities before and after the event start time or end time. When, e.g., retail stores in the vicinity of the event site make manpower planning or make a plan to purchase goods for stock, predicting a people flow is expected to provide an advantageous effect of preventing, inter alia, a cost increase because of overestimating a demand or an opportunity loss because of underestimating a demand. But, it is difficult to predict a people flow to occur when an event will take place, using statistical data that is acquired for the purpose of capturing a people flow behavior in an ordinary situation, such as statistics on transport facilities and a population census.

In order to predict a people flow differing from that in an ordinary situation, in Patent Literature 1, disclosed is a technical approach that performs measurement such as counting the number of people through processing images captured by cameras installed in the vicinity of a station and predicts congestion around the station based on a result of this measurement. Also, disclosed are technical approaches to determine a rate of congestion around the station by predicting the number of passing people in future, based on the usage situation of automatic ticket checkers in Patent Literature 2, and based on measurement through sensors in Patent Literature 3. In order to obtain a prediction of a people flow differing from that in an ordinary situation, these Patent Literatures concern the technical approaches that install measuring equipment such as camera, automatic ticket checkers, and sensors and predict a future people flow based on measurement of the number of people in a site where the equipment was installed.

CITATION LIST

Patent Literature

Patent Literature 1: Japanese Unexamined Patent Application Publication No. 2004-178358
Patent Literature 2: Japanese Patent Publication No. 5596592
Patent Literature 3: Japanese Patent Publication No. 6062124

SUMMARY OF INVENTION

Technical Problem

A time period for which a people flow can be predicted by people flow prediction described in Patent Literatures 1, 2, and 3 is restricted to about several hours. In consequence, it was impossible to predict a people flow to occur when an event will take place a long period later, e.g., several days later or several weeks later.

Solution to Problem

A people flow prediction device according to the present invention includes an event information storage unit which pre-stores event information designating an event site position and event date/time, a first processing unit which selects a set of event information that is similar to event information designating an event site position and event date/time which have been input out of the event information storage unit and specifies transport facilities from where a people flow will occur when an event will take place based on the selected set of event information, and a second processing unit which allocates an event attendance which has been input to the specified transport facilities.

Advantageous Effects of Invention

According to the present invention, it is enabled to predict a people flow when an event will take place a long period later, e.g., several days later or several weeks later.

BRIEF DESCRIPTION OF DRAWINGS

FIGS. 4(A) and 4(B) are the data structures of information which is input/output between a client device and a people flow prediction device.
FIGS. 5(A) to 5(C) are the data structures of data which is stored in a map information storage unit.
FIGS. 6(A) and 6(B) are the data structures of data which is stored in a people flow data storage unit and an event information storage unit.
FIGS. 7(A) and 7(B) are the structures of data which is created and processed within the people flow prediction device.
FIG. 8 is a diagram illustrating a procedure of people flow prediction processing by the people flow prediction device.
FIG. 9 is a diagram illustrating a processing procedure of nearby transport facility determination processing.
FIG. 10 is a diagram illustrating a processing procedure of pathway to walk determination processing.
FIG. 11 is a diagram illustrating a processing procedure of spatial allocation ratio calculation processing.

DESCRIPTION OF EMBODIMENTS

Figure 1:
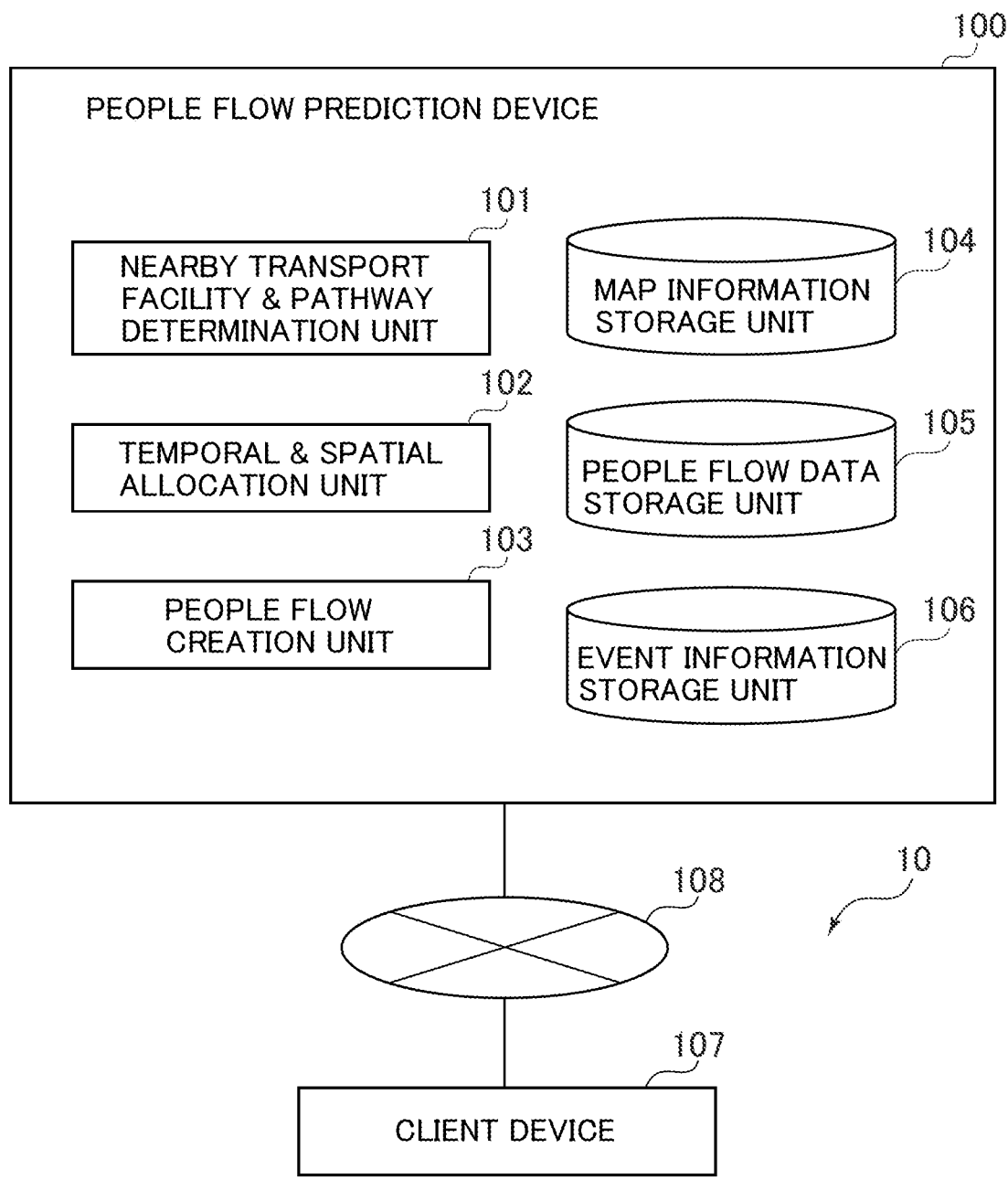
FIG. 1 is a diagram depicting architecture of a people flow prediction system.

FIG. 1 is a diagram depicting architecture of a people flow prediction system 10. The people flow prediction system 10 is comprised of a people flow prediction device 100 and a client device 107 interconnected over a network 108.

The people flow prediction device 100 includes a map information storage unit 104, a people flow data storage unit 105, an event information storage unit 106, a nearby transport facility and pathway determination unit 101, a temporal and spatial allocation unit 102, and a people flow creation unit 103.

The map information storage unit 104 stores map information such as the location of a transport facility and road information. The people flow data storage unit 105 stores past people flow data associated with an area and a date and time. The event information storage unit 106 stores event information associated with, inter alia, the date and time of an event that took place in the past. The nearby transport facility and pathway determination unit 101 determines nearby transport facilities and their associated pathways that event attendees will use, based on information stored in the map information storage unit 104, people flow data storage unit 105, and event information storage unit 106 as well as event information which has been input from the client device 107. Based on the attributes of the nearby transport facilities and pathways determined by the nearby transport facility and pathway determination unit 101, the temporal and spatial allocation unit 102 allocates an attendance in event information, input from the client device 107, to the origins of the pathways. The people flow creation unit 103 creates a people flow along each one of the pathways, based on the number of people occurring per unit time which has been specified for each pathway. Detail on each component will be described later.

The client device 107 inputs event information to the people flow prediction device 100 and acquires and displays a result of people flow prediction which has been predicted based on the event information from the people flow prediction device 100. Now, although the description herein takes the configuration in which the client device 107 is connected to the people flow prediction device 100 over the network 108 as an example, an input/output device with which the people flow prediction device 100 is equipped may be used instead of the client device 107.

One of the features of the present embodiment resides in that the people flow prediction device 100 performs a people flow prediction by temporally and spatially allocating an attendance which has been input as event information from the client device 107 to pathways, each connecting a transport facility at which a people flow originates and an event site. Consequently, it is enabled to predict a flow of people who attend an event or the like, the people flow differing from that in an ordinary situation, particularly, to predict a people flow to occur when the event will take place a long period later, without need to input real-time data.

Figure 2:
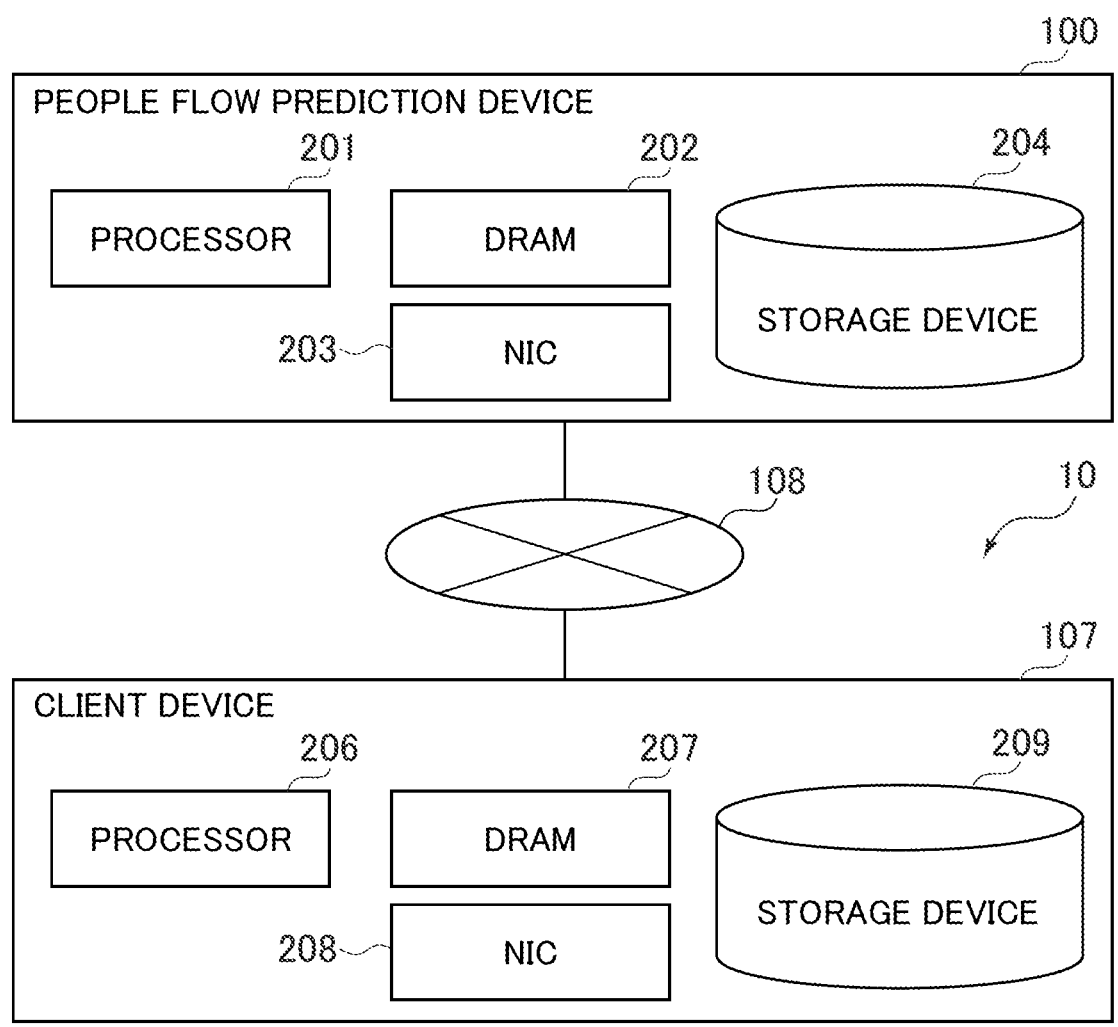
FIG. 2 is one example of a hardware structure in the people flow prediction system.

FIG. 2 is one example of a hardware structure in the people flow prediction system 10. The people flow prediction device 100 includes a processor 201 having arithmetic performance, a DRAM 202 which is a volatile temporary storage region, readable/writable at high speed, an NIC 203 which is an network interface card for performing communication, a storage device 204 which is a permanent storage region using an HDD, a flash memory, or the like. The client device 107 may be configured the same as the people flow prediction device 100 and includes a processor 206, a DRAM 207, an NIC 208, and a storage device 209.

Figure 3:
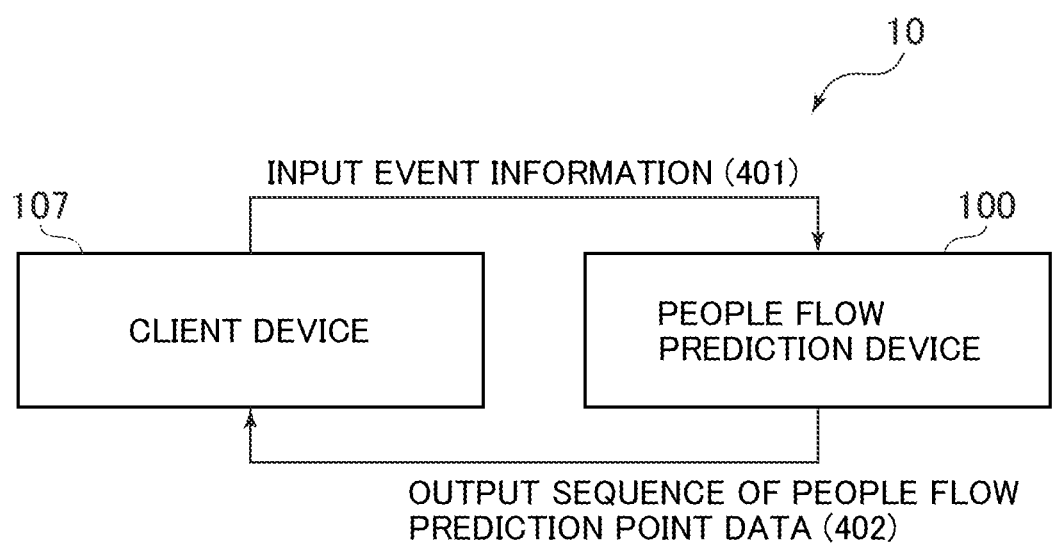
FIG. 3 is a diagram depicting an input/output procedure in the people flow prediction system.

FIG. 3 is a diagram depicting an input/output procedure in the people flow prediction system 10. The client device 107 accepts event information for which a people flow prediction is to be performed from a user and the client device 107 inputs the accepted event information (event information 401 which will be described later) to the people flow prediction device 100. The people flow prediction device 100 outputs a result of people flow prediction (such as people flow prediction point data 402 which will be described later) responsive to the input event information to the client device 107 and the client device 107 displays the result of people flow prediction to the user.

FIG. 4(A) is the data structure of event information 401 that the client device 107 inputs to the people flow prediction device 100. FIG. 4(B) is the data structure of people flow prediction point data 402, i.e., a result of people flow prediction that the people flow prediction device 100 outputs to the client device 107.

As is presented in FIG. 4(A), the event information 401 is a data string representing items named as follows: event name, event type, event site position, event date, event site open time, event start time, event end time, and attendance in order of item Nos. 1 to 8. The event name (item No. 1) may be a character string that can identify respective event information. The event type (item No. 2) is a character string for use in determining a degree of similarity of event information which will be described later; e.g., "sport", "concert", etc. The event site position (item No. 3) is a coordinate string locating an event site on map, such as a center point of an event site. The event date (item No. 4) is year, month, and day when the event takes place. The event site open time (item No. 5), event start time (item No. 6), and event end time (item No. 7) are time at which the event site opens, time at which the event is started, and time at which the event ends, respectively. The attendance (item No. 8) is a total number of people who will attend the event or its predicted value.

As is presented in FIG. 4 (B), the people flow prediction point data 402 is a data string representing items named as follows: person ID, person position, and time in order of item Nos. 1 to 3. The person ID (item No. 1) is a unique number assigned to each individual person. The person position (item No. 2) is positional coordinates indicating the position of each individual person, represented in a coordinate system such as latitude/longitude. The time (item No. 3) is time at which a person identified by the person ID (item No. 1) was at the positional coordinates specified by the person position (item No. 2). The people flow prediction device 100 outputs a sequence of pieces of the people flow prediction point data 402 as many as the attendance (item No. 8) in the event information 401 to the client device 107.

FIGS. 5 (A) to 5 (C) are the data structures of data that is stored in the map information storage unit 104 within the people flow prediction device 100.

FIG. 5(A) is the data structure of map information 501. The map information 501 is a data string representing items named as follows: transport facility data 502 and road information 503 in order of item Nos. 1 and 2. The transport facility data 502 (item No. 1) is a set of attributes including the positional coordinates of a transport facility among others and a pointer to transport facility data 502 as is presented in FIG. 5(B). The road information 503 (item No. 2) is information on a pathway that pedestrians can go through and a pointer to road information 503 as is presented in FIG. 5(C).

FIG. 5(B) is the data structure of transport facility data 502. The transport facility data 502 is a data string representing items named as follows: transport facility name, timetable, transport facility position, transport facility statistical information, and transport facility type in order of item Nos. 1 to 5. The transport facility name (item No. 1) is the name of a bus stop, a station, or the like. The timetable (item No. 2) is a timetable of the transport facility. The transport facility position (item No. 3) is the position of the station, bust stop, or the like, which depends on a coordinate system such as latitude/longitude. The transport facility statistical information (item No. 4) is statistics on usage of the transport facility. The transport facility type (item No. 5) is the type of the transport facility such as bus, railroad, etc.

FIG. 5(C) is the data structure of road information 503. The road information 503 is a data string representing items named as follows: geometry and attribute in order of item Nos. 1 and 2. The geometry (item No. 1) is geometry that defines the centerline of a road. The attribute (item No. 2) is a geometry attribute such as road width, pathway length, etc.

FIG. 6(A) is the data structure of people flow data 601 that is stored in the people flow data storage unit 105 within the people flow prediction device 100. People flow data 601 which has occurred in the past is cumulatively stored in the people flow data storage unit 105.

The people flow data 601 is a data string representing items named as follows: mesh ID, time, count, date, even flag in order of item Nos. 1 to 5. The mesh ID (item No. 1) is ID specific to an area mesh. The time (item No. 2) is a time of measurement of the number of people. The count (item No. 3) indicates how many persons stayed in the mesh specified by the mesh ID in item No. 1 at a given time and is a value in units of persons/time. The date (item No. 4) is a date when the number of people was measured. The event flag (item No. 6) is a flag indicating whether the count in item No. 3 of the people flow data 601 was measured when an event took place and may be data that generally assumes one of two values, e.g., True and False, or 1 and 0. As will be appreciated from the foregoing, the people flow data 601 refers to data in which the number of persons (item No. 3) was recorded for a certain measurement time (item No. 2) on a date (item No. 4) for each area mesh (item No. 1).

FIG. 6(B) is the data structure of event information 602 that is stored in the event information storage unit 106 within the people flow prediction device 100. Event information 602 for a given period that took place in the past is accumulated in the event information storage unit 106.

The event information 602 is a data string representing items named as follows: event name, event type, event site position, event date, event site open time, event start time, event end time, and attendance in order of item Nos. 1 to 8. The event name (item No. 1) may be a character string that can identify respective event information. The event type (item No. 2) is a character string for use in determining a degree of similarity of event information which will be described later; e.g., "sport", "concert", etc. The event site position (item No. 3) is a coordinate string locating an event site on map, such as a center point of an event site. The event date (item No. 4) is year, month, and day when the event takes place. The event site open time (item No. 5), event start time (item No. 6), and event end time (item No. 7) are time at which the event site opens, time at which the event is started, and time at which the event ends, respectively. The attendance (item No. 8) is a total number of people who attend the event or its predicted value.

FIGS. 7(A) and 7(B) are the data structures that are created and processed within the people flow prediction device 100. FIG. 7(A) is the data structure of nearby transport facility data 701. The nearby transport facility data 701 is a data string representing items named as follows: transport facility name, timetable, transport facility position, transport facility statistical information, transport facility type, and similar event in order of item Nos. 1 to 6. The transport facility name (item No. 1) is the name of a bus stop, a station, or the like. The timetable (item No. 2) is a timetable of the transport facility, which is used, inter alia, to calculate a peak of time when a larger number of people occurs in people occurrence processing which will be described later. The transport facility position (item No. 3) is the position of the station, bust stop, or the like and it is a coordinate string that is used in calculating distance from the event site to the transport facility in spatial allocation ratio calculation processing which will be described later. The transport facility statistical information (item No. 4) is statistics on usage of the transport facility. The transport facility type (item No. 5) describes a bus, a railroad, etc. with a character string and it is used, inter alia, in processing to change weighting of spatial allocation ratio with respect to each type in spatial allocation ratio calculation processing which will be described later. The similar event (item No. 6) is a pointer to event information 602, which indicates that the nearby transport facility data 701 has been used for a similar event in the past.

FIG. 7(B) is the data structure of temporal and spatial allocation data 702. The temporal and spatial allocation data 702 is a data string representing items named as follows: nearby transport facility data, pathway information, spatial allocation ratio, and temporal distribution function in order of item Nos. 1 to 4. The nearby transport facility data (item No. 1) is a pointer to nearby transport facility data 701. The pathway information (item No. 2) is information on a road connecting a transport facility and the event site and this road information is represented by the road information 503 as is presented in FIG. 5(C). The spatial allocation ratio (item No. 3) is a proportion of the number of people flowing along a pathway (item No. 2) among the attendance (item No. 8 of event information 401). The temporal distribution function (item No. 4) is a function expressing temporal bias of occurrence of people gathering at the origin of the pathway (item No. 2).

FIG. 8 is a diagram illustrating a procedure of people flow prediction processing by the people flow prediction device 100. A program illustrated by this processing procedure and processing procedures which will be described later can be executed by a computer equipped with, inter alia, a CPU and a memory. All processing tasks or a part thereof may be implemented by hard logic circuits. Furthermore, this program can be provided as pre-stored in a storage medium of the people flow prediction device 100. Alternatively, the program as stored in an independent storage medium may be provided or the program may be recorded and stored into a storage medium of the people flow prediction device 100 through a network link. The program may also be supplied as a computer-readable computer program product that may be provided in diversified forms including, inter alia, data signals (carries).

At step S802 in FIG. 8, the nearby transport facility and pathway determination unit 101 accepts event information 402 from the client device 107.

Then, the determination unit proceeds to step S802 and performs nearby transport facility determination processing. It determines a nearby transport facility as the origin from which event attendees walk and move to the event site, based on the event information 401, input from the client device 107, and map information 501 having information on transport facilities and roads; detail on this processing will be described later with reference to FIG. 9.

Then, the determination unit proceeds to step S803 and performs pathway to walk determination processing. It determines a pathway along which event attendees walk and move to the event site from the determined nearby transport facility; detail on this processing will be described later with reference to FIG. 10. Generally, a plurality of transport facilities may exist for access to one event site. Also, generally, a plurality of pathways may exist for walk from one nearby transport facility to the event site. Therefore, the nearby transport facility and pathway determination unit 101 creates nearby transport facility data with respect to each pathway to walk.

At a next step S804, the temporal and spatial allocation unit 102 performs special allocation ratio calculation processing. It determines a proportion of the number of people flowing along a pathway (item No. 2 of temporal and spatial allocation data 702) among the attendance (item No. 8 of event information 401) as a spatial allocation ratio; detail on this processing will be described later with reference to FIG. 11.

At a next step S805, the temporal and spatial allocation unit 102 performs temporal distribution function determination processing. It determines a function expressing temporal bias of occurrence of people gathering at the origin of the pathway (item No. 2 of temporal and spatial allocation data 702) as a temporal distribution function; detail on this processing will be described later with reference to FIG. 12.

Then, at step S806, the people flow creation unit 103 performs people occurrence processing. It creates people flow prediction point data 402, based on the created temporal and spatial allocation data 702; detail on this processing will be described later with reference to FIG. 13.

At a next step S807, the people flow creation unit 103 performs people move processing. It performs people move processing on positional coordinates, based on the created people flow prediction point data 402; detail on this processing will be described later with reference to FIG. 14.

Subsequently, the people flow creation unit proceeds to step S808 and outputs, inter alia, a sequence of the people flow prediction point data 402 to the client device 107. Upon receiving this data, the client device 107 displays a result of prediction.

FIG. 9 is a diagram illustrating a processing procedure of the nearby transport facility determination processing. This diagram illustrates details of the step 802 in FIG. 8.

At step S901 in FIG. 9, a determination is made as to whether there is a set of information among all sets of the event information 602 stored in the event information storage unit 106, the set of information having a predefined degree of similarity, at or above its certain threshold, to the event information 401 acquired from the client device 107. The degree of similarity may be any function that fulfills an axiom of distance, which has heretofore been known, defined between event information sets. For example, to evaluate the degree of similarity, a function as below may be applied. Give two sets of event information for arguments of the function. If the event site position (item No. 3 of the event information 602 in FIG. 6) included in one set of the event information 602 given for an argument matches the corresponding one in the other set of event information, the function gets a value of 100; if the event type (item No. 2 of the event information 602) matches likewise, the function gets a value of 10; if the event name (item No. 1 of the event information 602) matches likewise, the function gets a value of 5; if the event end time (item No. 7 of the event information 602) matches likewise, the function gets a value of 20; and so on. The function returns a total of these values. Here, the threshold of the degree of similarity may be a real value that is set optionally depending on the function that defines the degree of similarity. For instance, in a case where a degree of similarity function is used, the threshold may expediently be set at a value of 110, if it is desired to select a set of information in which matching occurs in terms of the event site position (item No. 3 of the event information 602) and the event type (item No. 2 of the event information 602).

As a result of the reference to the event information storage unit 106 at step S901, if there is no set of the event information 602 having a degree of similarity at or above its threshold, a transition is made to step S902. At step S902, as nearby transport facilities around the event site specified in the input event information 401, the processing acquires transport facilities that exist within a certain threshold of distance which is defined by a predefined distance function from the map information storage unit 104. Here, the distance function may be, inter alia, a distance to walk that is calculated by a function that fulfills an axiom of pseudo distance, which has heretofore been known, e.g., Euclidean distance, and road information. Here, the threshold of the distance may be an optional real value. For instance, the processing may select all transport facilities that fall within a distance to walk of 2 km to the event site.

As a result of the reference to the event information storage unit 106 at step S901, otherwise, if there are one or more sets of the event information having a predefined degree of similarity more than its threshold, a transition is made to step S903. At step S903, the processing acquires the event date in a set of event information having the highest degree of similarity from the event information storage unit 106. If there are events having an equal maximum value of similarity, the processing may select any of the events.

Then, the processing proceeds to step S904 and acquires people flow data 601 on the event date in the set of event information selected at step S903 from the people flow data storage unit 105. When acquiring the people flow data 601, the processing may acquire, for example, only data that has area meshes contained within a certain radius, e.g., 10 km from the event site position.

Then, the processing proceeds to step S905 and acquires people flow data 601 for a certain number of days before and after the event date and with the event flag value being "False" in item No. 5 of the people flow data 601, as people flow data 601 in an ordinary situation. The certain number of days before and after the event date may be set optionally, e.g., to one day or one week. In addition, the processing may acquire multiple sets of this people flow data 601 in an ordinary situation and perform processing, in particular, calculating a weighted arithmetic average of these sets, thus creating new people flow data 601 in an ordinary situation. The new people flow data 601 may be used in calculating a difference at a subsequent step S906 as people flow data 601 in an ordinary situation. An advantage of performing such processing resides in, for example, avoiding strong dependence on selecting people flow data 601 on a particular day, when a determination is made by calculating a difference from a people flow in an ordinary situation.

Then, the processing proceeds to step S906. Based on the people flow data 601 on the event date acquired at step S904 and the people flow data 601 in an ordinary situation acquired at step S905, the processing subtracts the count in the people flow data 601 in an ordinary situation from the count in the people flow data 601 on the event date with respect to each mesh ID, thus calculating a difference between them, and acquires mesh IDs for which a difference is at or above a certain threshold. Here, count subtraction in step S906 may be replaced by another algebra calculation, e.g., division is performed to obtain a quotient of 1 or more. An advantageous effect that is obtained by replacing simple subtraction is, inter alia, as follows: for instance, when a negative value results from subtraction, that is, more people is counted in an ordinary situation than the event date, it is possible to avoid an effect attributed to an error caused by selecting people flow data 601 on a particular day as people flow data 601 in an ordinary situation.

Next, the processing proceeds to step S907. If the positional coordinates of a transport facility fall within an area mesh corresponding to a mesh ID acquired at step S906, the processing creates nearby transport facility data 701 for each transport facility. In the similar event row, item No. 6 of the nearby transport facility data 701 that is created, the processing records a pointer to a set of event information 602 selected at step S903.

At a next step S908, the processing creates nearby transport facility data 701 (see FIG. 7) for each transport facility acquired at step S902 or step S907. At this time, the similar event row, item No. 6 of the nearby transport facility data 701 may be initialized, e.g., filled with null data.

At a next step S908, for each nearby transport facility, the processing creates temporal and spatial allocation data 702 in which a pointer to the nearby transport facility data 701 is specified in item No. 1 of the temporal and spatial allocation data 702 (see FIG. 7). At this point of time, other item Nos. 2 to 4 of the temporal and spatial allocation data 702 are filled with null data.

FIG. 10 is a diagram illustrating a processing procedure of the pathway to walk determination processing. This diagram illustrates details of the step S803 in FIG. 8. This processing determines pathway information, item No. 2 of the temporal and spatial allocation data 702.

At step S1001 in FIG. 10, the processing accepts the temporal and spatial allocation data 702 in which a pointer to the nearby transport facility data 701 generated through the nearby transport facility determination processing (S802) is specified.

At a next step S1002, referring to the map information storage unit, the processing executes searching for a pathway to the event site, based on the nearby transport facility data 701 that is pointed to in item No. 1 of the temporal and spatial allocation data 702 accepted at step S1001. Although it is generally possible to determine a pathway connecting two points on map from, inter alia, road information, item No. 2 of map information 501, a pathway that pedestrians use when an event takes place becomes important especially in people flow prediction when an event takes place. Hence, a pathway may expediently be determined based on past people flow records in addition to the map information 501. An advantageous effect that is obtained by this is enabling people flow prediction that is close to a people flow behavior in an actual event situation.

Thus, at step S1002, with respect to each nearby transport facility data 701 associated with the temporal and spatial allocation data 702, the processing searches for a pathway from the nearby transport facility to the event site by the map information storage unit 104.

Then, the processing proceeds to step S1003 and determines whether a pathway that was searched out is used when an event takes place. First, the processing makes sure if the similar event row, item No. 6 of the nearby transport facility data 701 is not filled with null data. If the similar event row is not filled with null data, the processing proceeds to step S1004.

At step S1004, the processing selects event information 602 that is pointed to by event information stored in the similar event row, item No. 6 of the nearby transport facility data 701 from the event information storage unit 106.

Then, the processing proceeds to step S1005 and acquires people flow data 601 on the event date in the event information selected at step S1004 from the people flow data storage unit 105. When acquiring the people flow data 601, the processing may acquire, for example, only data that has area meshes contained within a certain radius, e.g., 10 km from the event site position.

Next, the processing proceeds to step S1006 and acquires people flow data 601 for a certain number of days before and after the event date and with the event flag value being "False" in item No. 5 of the people flow data 601, as people flow data 601 in an ordinary situation. The certain number of days before and after the event date may be set optionally, e.g., to one day or one week. In addition, the processing may acquire multiple sets of this people flow data 601 in an ordinary situation and perform processing, in particular, calculating a weighted arithmetic average of these sets, thus creating new people flow data 601 in an ordinary situation. The new people flow data 601 may be used in calculating a difference at a subsequent step S1007 as people flow data 601 in an ordinary situation. An advantage of performing such processing resides in, for example, avoiding strong dependence on selecting people flow data 601 on a particular day, when a determination is made by calculating a difference from a people flow in an ordinary situation.

Then, the processing proceeds to step S1007. Based on the people flow data 601 on the event date acquired at step S1005 and the people flow data 601 in an ordinary situation acquired at step S1006, the processing subtracts the count in the people flow data 601 in an ordinary situation from the count in the people flow data 601 on the event date with respect to each mesh ID, thus calculating a difference between them, and acquires mesh IDs for which a difference is at or above a certain threshold.

At a next step S1008, the processing selects a subset of pathways searched out at step S1002, the subset being covered by area meshes corresponding to mesh IDs selected at step S1007 at a coverage factor that is at or above a certain threshold. Here, the coverage factor is a proportion of the number of area meshes specified by the selected mesh IDs, in which the geometry of item No. 1 of road information 503 is included in the geometries of these area meshes. For instance, if the geometry of item No. 1 of road information 503 is included in five area meshes, of which three area meshes are selected, the coverage factor is calculated as 3/5. Its threshold may optionally be set to a positive value less than or equal to 1.

At a next step S1009, the processing records pathway information, item No. 2 of the temporal and spatial allocation data 702 for each pathway selected at step S1008.

If it is determined at step S1003 that the similar event row is filled with null data, the processing proceeds to step S1010, selects all pathways searched out, and proceeds to step S1009.

In this way, for all the pathways selected, the processing selects transport facility data 502 from which they originate and records information on roads connecting the transport facilities and the event site as pathway information in the temporal and spatial allocation data 702.

FIG. 11 is a diagram illustrating a processing procedure of the spatial allocation ratio calculation processing. This diagram illustrates details of the step S804 in FIG. 8. This processing determines a spatial allocation ratio, item No. 3 of the temporal and spatial allocation data 702. By this processing, a calculation is made of a ratio of allocating the attendance, item No. 8 of event information 401 to each of nearby transport facilities.

At step S1101 in FIG. 11, the processing acquires a sequence of sets of temporal and spatial allocation data 702 created by the nearby transport facility and pathway determination unit 101. At a next step S1102, the processing initializes the spatial allocation ratio, item No. 3 of each set of temporal and spatial allocation data 702 in the sequence of temporal and spatial allocation data. An initial value of the initialized spatial allocation ratio may be any value other than 0. However, the initial value of the spatial allocation ratio has to be the same value for all sets of temporal and spatial allocation data 702.

Then, at step S1103, the processing calculates a pathway length, based on the pathway information, item No. 2 of each set of temporal and spatial allocation data 702 in the sequence. To calculate a pathway length, Euclidean distance or great-circle distance of a line connecting the starting point and the terminating point of a pathway, which has heretofore been known, and a distance to walk along the pathway may be used. Then, the processing multiplies a spatial allocation ratio, item No. 3 of temporal and spatial allocation data 702 by the reciprocal of the thus calculated distance. For this multiplication, a function of distance, in particular, any monotonically decreasing function in a broad sense may be applied. For example, exponentiation of the reciprocal of the distance which is commonly used may be applied. Thereby, the longer the distance of a pathway to walk, the smaller the spatial allocation ratio for the pathway will be set.

At a next step S1104, the processing weights each transport facility, based on transport facility statistical information associated with nearby transport facility data, item No. 1 of each set of temporal and spatial allocation data 702. Weighting depending on the usage situation of each transport facility is applied; for example, a weight of 3 for a railroad and 1 for bus. Then, the processing multiplies the spatial allocation ratio obtained at step S1103 by the weight. Here, the transport facility statistical information refers to statistics information, for example, an annual average of the number of passengers who use the transport facility, the tendency to select the transport facility depending on the type of the transport facility, person trip data, etc.

After the above processing is performed for each element in the sequence of sets of the temporal and spatial allocation data 702, all values of spatial allocation ratio are normalized at a next step S1105. Normalization termed here means updating the spatial allocation ratios so that summing all values of spatial allocation ratio in the sequence of sets of the temporal and spatial allocation data 702 gives 1.

Figure 12:
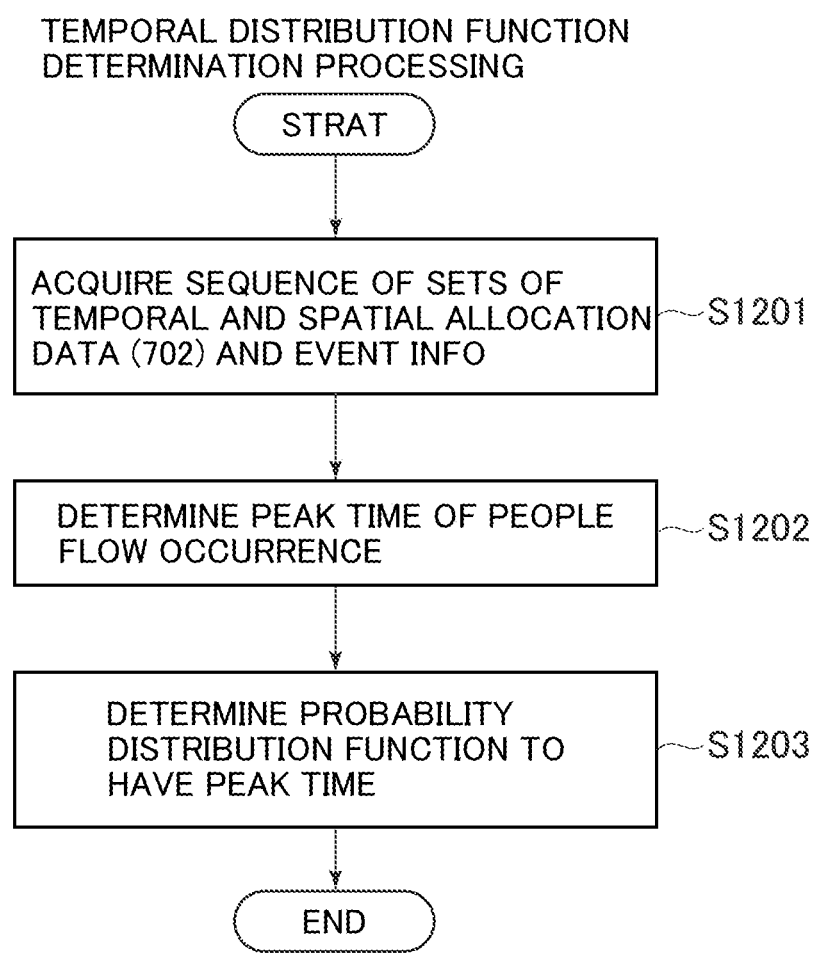
FIG. 12 is a diagram illustrating a processing procedure of temporal distribution function determination processing.

FIG. 12 is a diagram illustrating a processing procedure of the temporal distribution function determination processing. This diagram illustrates details of the step S805 in FIG. 8. This processing determines a temporal distribution function, item No. 4 of the temporal and spatial allocation data 702. That is, the processing determines how a people flow originating from a specified transport facility is distributed temporally.

At step S1201 in FIG. 12, the processing acquires the sequence of sets of temporal and spatial allocation data 702 updated by the spatial allocation ratio calculation processing and the event information 401 which has been input from the client device 107.

At a next step S1202, the processing determines peak time of people flow occurrence, based on the event information 401. For this calculation, time that has been predetermined optionally according to event type may be assigned; e.g., if event type in the event information 401 is a sport match and start time is 14:00, peak time is 12:00, two hours before or if event type is a music concert and site open time is 18:00, peak time is 17:30, 30 minutes before, and so on. Also, multiple peak times may be assigned. For example, one peak time may be set at 30 minutes before the site open time and another peak time may be set at one hour before the start time. Also, different values of peak time may be set for different pathways specified for pathway information, item No. 2 of the temporal and spatial allocation data 702.

Then, at step S1203, the processing determines a probability distribution function to have a peak time determined. Here, the probability distribution function may be any real function with one variable that fulfills an axiom of probability, which has heretofore been known. Also, the support of the probability distribution function may be bounded or unbounded. For example, probability distribution functions such as a Poisson distribution and a Gamma distribution, which have heretofore been known and a linear combination of them, or the like, may be used. Use of a linear combination of distribution functions which have heretofore been known provides an advantageous effect of making it possible to express a temporal people flow distribution with more complex peak times.

The processing records a probability distribution function thus determined into the row of temporal distribution function, item No. 4 of the temporal and spatial allocation data 702 for each set of this data in the sequence.

Figure 13:
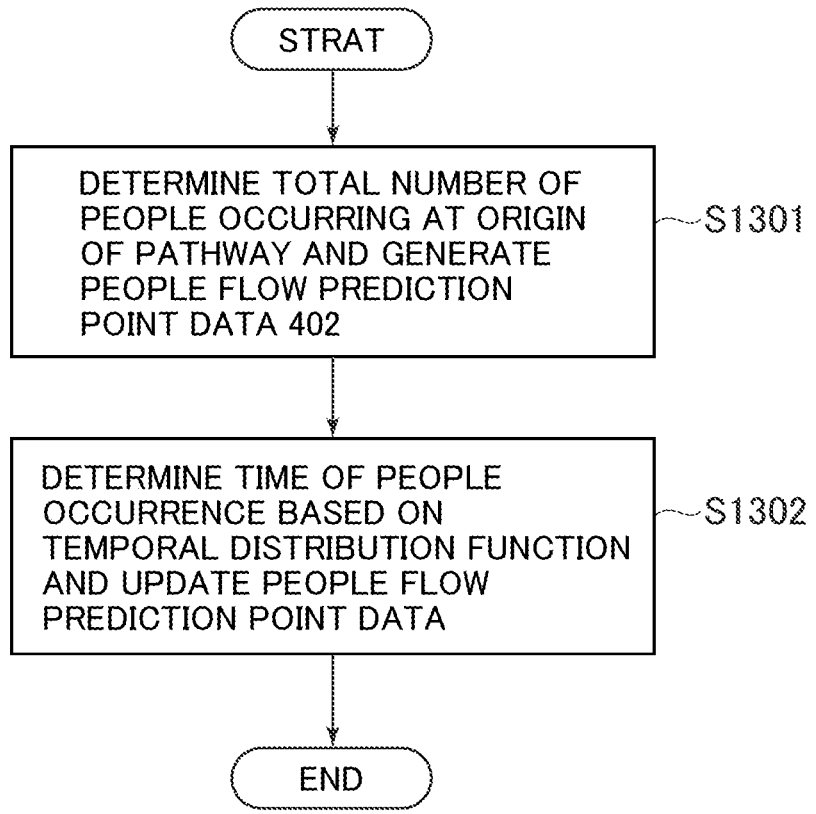
FIG. 13 is a diagram illustrating a processing procedure of people occurrence processing.

FIG. 13 is a diagram illustrating a processing procedure of people occurrence processing which is performed by the people flow creation unit 103. This diagram illustrates details of the step S806 in FIG. 8. This processing creates people flow prediction point data 42 associated with each pathway.

At step S1301 in FIG. 13, the processing determines a total number of people occurring at the origin of each pathway (the position of a nearby transport facility). Specifically, we take N to stand for an attendance in the event information 401 which has been input from the client device and r_i to stand for a spatial allocation ratio for element i, i.e., each set of temporal and spatial allocation data 702 in the sequence. First, the processing determines a total number of people N_i occurring along a pathway specified by pathway information in element i of temporal and spatial allocation data 702. This is obtained by multiplying the attendance N, item No. 8 of the event information 401 by spatial allocation ratio r_i. Then, the processing creates people flow prediction point data 402 having a total number of people per pathway at the origin of each pathway (the position of a nearby transport facility).

At a next step S1302, the processing temporally allocates the total number of people per pathway determined at the origin of each pathway (the position of a nearby transport facility) over each pathway. That is, time of people arrival at a point over the pathway is determined by a temporal distribution function. Specifically, taking f_i(t) to stand for the temporal distribution function, for example, the processing calculates the number of people n_i(t) occurring from time t to t+Δt by N_i×f_i(t) Δt. Taking D_i to stand for each set of temporal and spatial allocation data 702, based on n_i(t), the processing creates people flow prediction point data 402 having items mentioned below as many as n_i(t) for each time t and for each data D_i. That is, data having an integer which is assigned by a predefined procedure as person ID, item No. 1 of people flow prediction point data 402, having the coordinates of a transport facility specified by transport facility data in data D_i as person position, and having time t as time is created as many as n_i(t) in total. Here, a way of assigning person ID is any way of assigning a number that is to be used only once during one time of people flow prediction processing.

Here, time t refers to time, such as t minutes or t hours earlier from a predefined origin of time. Likewise, time t may denote t minutes later or t hours later from the predefined origin of time. Here, the origin and direction of time should be consistent through one people flow prediction processing. The origin of time may optionally be set, inter alia, at time at which an event starts or time at which the event site opens. A domain of definition of time t may by any domain that includes a domain of definition of a temporal distribution function, item No. 4 of temporal and spatial allocation data 702.

Although the above description gives an example of a deterministic people flow prediction based on a temporal distribution function, item No. 4 of temporal and spatial allocation data 702, the processing may generate people flow prediction point data 402 based on occurrence time sampled according to a Monte Carlo method, which has heretofore known, based on a temporal distribution function, item No. 4 of temporal and spatial allocation data 702

Figure 14:
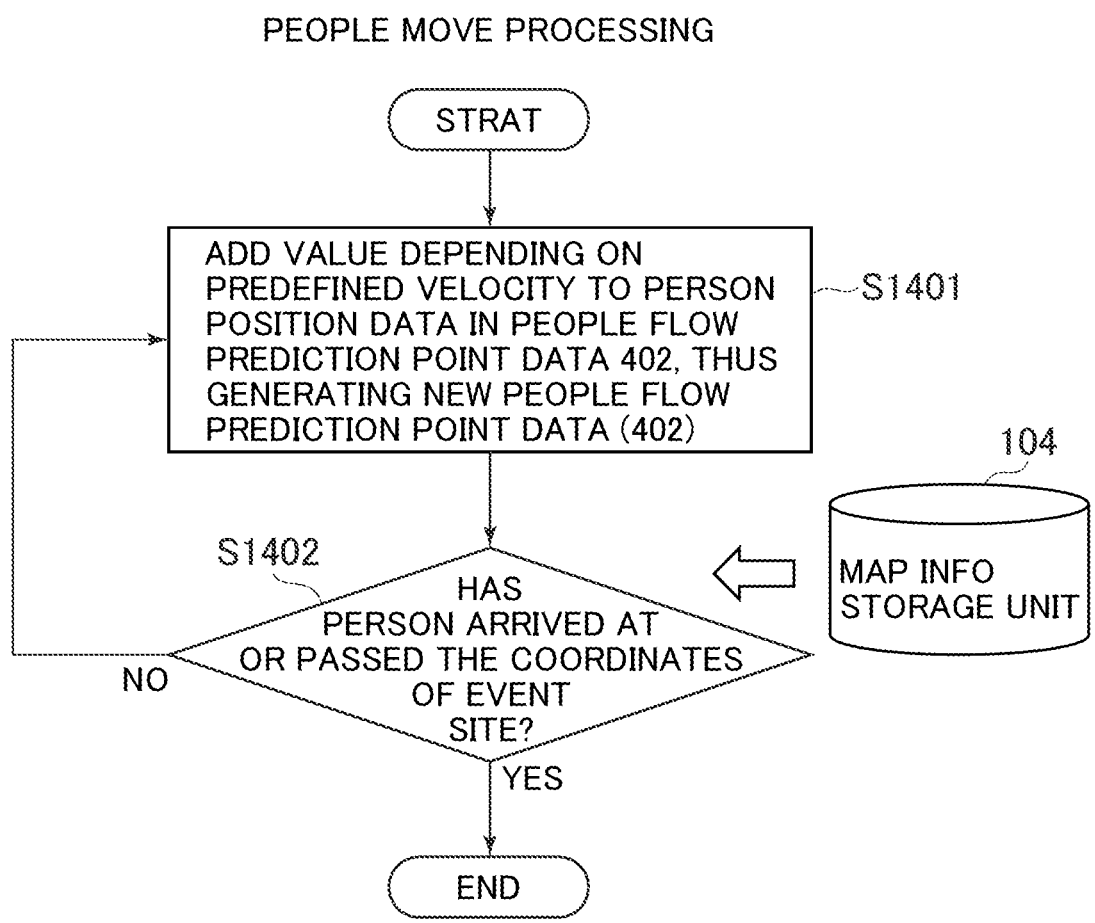
FIG. 14 is a diagram illustrating a processing procedure of people move processing.

FIG. 14 is a diagram illustrating a processing procedure of people move processing. This diagram illustrates details of the step S807 in FIG. 8. This processing generates people flow prediction point data 402 with regard to people moving along each pathway.

At step S1401 in FIG. 14, the processing adds a value depending on predefined velocity to person position data in people flow prediction point data 402 and thus generates new people flow prediction point data 402. That is, with respect to each set of people flow prediction point data that represents the position and time of person occurrence created by people occurrence processing (S806), the processing creates new people flow prediction point data 402 that represents a temporal change of the position of a person specified by person ID, item No. 1 of people flow prediction point data 402, as the person walks and moves. This processing is performed for each set of people flow prediction point data 402 created by people occurrence processing.

The positional coordinates of a person after elapse of a predefined step of time Δt is the coordinates of a point to which the person has moved by v Δt, where v stands for velocity, along pathway i. Here, the velocity may be common for all person IDs, may be changed for each pathway i, or may be changed for each person ID and for each time t. Here, the step of time Δt may be an optional period of time, e.g., one minute, 10 minutes, or one hour. By setting Δt to a shorter duration, it is enabled to predict a people flow behavior in detail. In addition, detailed adjustment, such as changing velocity v per certain time, provides an effect of enabling a people flow prediction that is closer to actual movement of people. This processing is performed at step S1402 for each set of people flow prediction point data 402 and repeated until the positional coordinates of a person matches the coordinates of the event site or the person's coordinate value gets out of the pathway by moving (passing it). The processing deletes people flow prediction point data 402 in which the positional coordinates get out of the pathway and terminates the people move processing for the person ID.

When there is no longer people flow prediction point data 402 to be processed by the people move processing, the processing creates a sequence consisting of created sets of people flow prediction point data 402 as elements and outputs it to the client device 107 as processing in the step S808 (FIG. 8).

Figure 15:
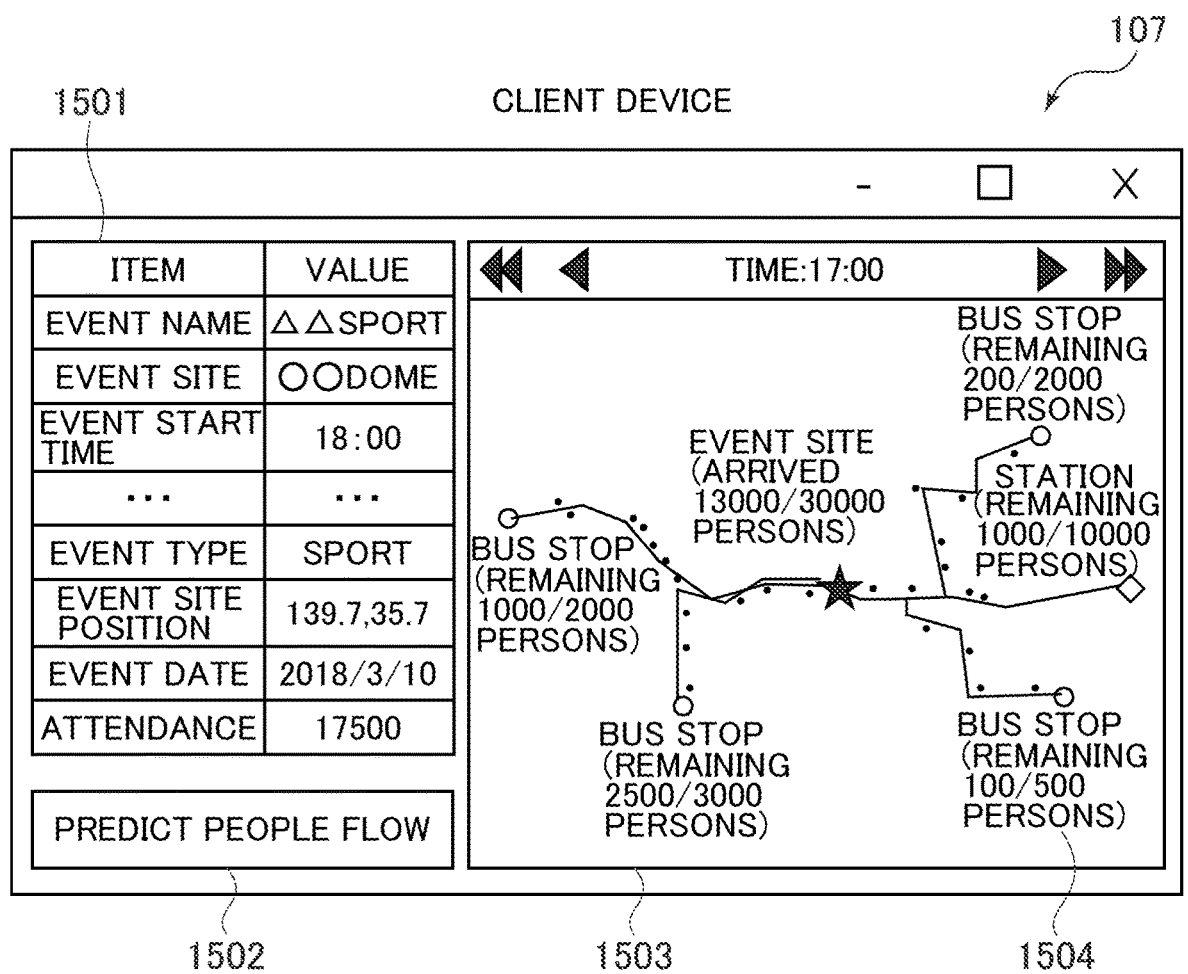
FIG. 15 is a diagram depicting a user interface of the client device.

FIG. 15 depicts one example of a user interface of the client device 107. The client device 107 includes an input area 1501 allowing its user to set event information 401 in the input area 1501 so that the event information is input to the people flow prediction device 100. When the user presses a portion to press 1502, even information 401 set in the input area 1501 is input to the people flow prediction device 100 and the people flow prediction device 100 starts people flow prediction processing. A display area 1503 is for displaying, inter alia, people flow prediction point data 402 that the people flow prediction device 100 has output to the client device 107 as a result of people flow prediction processing. A graphic in the display area 1503 may be drawn on a background map. In the display area 1503, a white circle and a white square denote the positions of nearby transport facilities, a star denotes the event site in event information 401, a slid line denotes a pathway in temporal and spatial allocation data 702, and a black dot on the pathway denotes the position of one of people flow prediction point data 402. For example, remaining 100/500 persons displayed beside a nearby transport facility 1504 means that, among 500 persons that the people flow prediction device 100 allocated to the nearby transport facility, remaining 100 persons will occur from time 17:00 displayed on top of the display area until the event start time.

According to the embodiment described hereinbefore, the following advantageous effects in operation are obtained.

(1) The people flow prediction device 100 includes the event information storage unit 106 which pre-stores event information 602 designating an event site position and event date/time, the nearby transport facility and pathway determination unit 101 which selects a set of event information 602 similar to event information 401 designating an event site position and event date/time which have been input out of the event information storage unit 106 and specifies transport facilities from where a people flow will occur when an event will take place based on the selected set of event information 602, and the temporal and spatial allocation unit 102 which allocates an event attendance which has been input to the specified transport facilities. This enables it to predict a people flow when an event will take place a long period later, e.g., several days later or several weeks later.

(2) The people flow prediction device 100 further includes the people flow data storage unit 105 which pre-stores the number of people existing per area associated with date and time and the nearby transport facility and pathway determination unit 101 refers to the people flow data storage unit 105 and specifies transport facilities related to people flow data corresponding to a difference between people flow data in an ordinary situation and people flow data on an event date. This enables it to specify transport facilities around the event site when an event will take place.

(3) The people flow prediction device 100 further includes the map information storage unit 104 which stores the positions of transport facilities and road information and the nearby transport facility and pathway determination unit 101 specifies transport facilities from which a people flow will occur, referring to the people flow data storage unit 105 and the map information storage unit 104. This enables it to exactly specify transport facilities around the event site when an event will take place.

(4) The nearby transport facility and pathway determination unit 101 determines pathways to walk from the specified transport facilities to the event site, referring to the map information storage unit 104. This enables it to exactly specify pathways to walk from the transport facilities when an event will take place.

(5) The temporal and spatial allocation unit 102 allocates the event attendance so that an allocation ratio decreases the longer the distance of each one of the pathways to walk.

This enables it to allocate a number of people to a pathway to walk depending on the distance of a pathway to walk.

(6) The temporal and spatial allocation unit 102 allocates the event attendance as a function of temporal distribution having a peak time of a people flow based on event date/time in the event information 401 which has been input. This enables it to allocate a number of people to a pathway to walk depending on time as a temporal distribution function.

(7) The people flow creation unit 103 creates people flow data along each one of the pathways to walk based on an allocation ratio and temporal change. This enables it to obtain people flow data along a pathway to walk.

The present invention is not limited to the foregoing embodiment and other embodiments that can be conceived within the scope of the technical concept of the present invention are also included within the scope of the present invention unless they impair the features of the present invention.

LIST OF REFERENCE SIGNS

10 People flow prediction system
100 People flow prediction device
101 Nearby transport facility and pathway determination unit
102 Temporal and spatial allocation unit
103 People flow creation unit
104 Map information storage unit
105 People flow data storage unit
106 Event information storage unit
107 Client device
108 Network
402 People flow prediction point data
501 Map information
502 transport facility data
503 Road information
601 People flow data
701 Nearby transport facility data
702 Temporal and spatial allocation data

The invention claimed is:

1. A people flow prediction device comprising:
a memory which pre-stores event information designating an event site position and event date/time, pre-stores people flow data including the number of people existing per area associated with date and time, and stores map information including the positions of transport facilities and road information;
a processor communicatively coupled to the memory, wherein the processor configured to:
selects a set of event information that is similar to event information designating an event site position and event date/time which have been input out of the event information storage unit and specifies transport facilities from where a people flow will occur when an event will take place based on the selected set of event information,
allocate an event attendance which has been input to the specified transport facilities,
refer to the people flow data stored in the memory and specify transport facilities related to the people flow data corresponding to a difference between people flow data in an ordinary situation and people flow data on an event date,
specify the transport facilities from where a people flow will occur, referring to the people flow data and the map information stored in the memory, and
determine pathways to walk from the specified transport facilities to the event site, referring to the map information stored in the memory.

2. The people flow prediction device according to claim 1, wherein the processor allocates the event attendance so that an allocation ratio decreases as the distance of each one of the pathways to walk is longer.

3. The people flow prediction device according to claim 2, wherein the processor allocates the event attendance as a function of temporal distribution having a peak time of a people flow based on event date/time in event information which has been input.

4. The people flow prediction device according to claim 3, wherein the processor creates people flow data along each one of the pathways to walk based on the allocation ratio and the temporal distribution.

* * * * *